United States Patent

Schutter

[15] 3,653,419

[45] Apr. 4, 1972

[54] EXTRUDER SCREEN PLATE CHANGE-OVER MECHANISM

[72] Inventor: Dieter Schutter, Hannover, Germany

[73] Assignee: Hermann Berstorff Maschinenbau GmbH, Hannover-Kleefeld, Germany

[22] Filed: Mar. 25, 1970

[21] Appl. No.: 22,574

[30] Foreign Application Priority Data

Apr. 16, 1969 Germany.....................P 19 19 269.9

[52] U.S. Cl. ...........................146/174, 18/12 B, 18/12 SM
[51] Int. Cl............................................B29b 5/00
[58] Field of Search.........................146/172–176; 18/12 B, 12 SM

[56] References Cited

UNITED STATES PATENTS 2,661,497  12/1953  Birmingham......................146/174 X

*Primary Examiner*—Willie G. Abercrombie
*Attorney*—Mason, Mason & Albright

[57] ABSTRACT

An extruder screen plate change-over mechanism comprises a slide carrying two screen-plates and movable transversely to a flow passage to the mix to place a selected one of the plates in alignment with the flow passage. The plate is clamped in position by a bush forced against the slide by thrust pins arranged uniformly around the bore of the bush. The axis of each pin defines a generator line of the same imaginary cone.

3 Claims, 3 Drawing Figures

Patented April 4, 1972

3,653,419

INVENTOR
DIETER SCHUTTER
BY
Mason, Mason & Albright
ATTORNEYS

EXTRUDER SCREEN PLATE CHANGE-OVER MECHANISM

BACKGROUND OF THE INVENTION

1. Field of the Invention

The invention relates to an extruder screen plate change-over mechanism.

2. Description of the Prior Art

An extruder screen plate change-over mechanism proposed hitherto incorporates a slide which carries at least two screen plates, the slide being locked in position by a locking ring. The slide is moved by a hydraulic operating device.

The difficulty with this mechanism lies in obtaining an adequate seal between the slide and the passage for the extrusion mix, since the worm of the extruder can produce pressures in excess of 300 atmospheres.

In this mechanism the seal is provided by a cylindrical bush, which is forced against the slide by cottering or screwing, so as to seal the slide completely against the pressure of the mix. While the slide is locked in position, the temperature of the mechanism is raised due to the working of the mix and the cotters become jammed and are difficult to release, when it is desired to move the slide. Moreover, the geometrical shape of the cotters inevitably gives rise to components of thrust that can be offset only by relatively complex means.

Similar problems arise when screw pressure is applied to the bush to lock the slide.

SUMMARY OF THE INVENTION

According to the invention, there is provided an extruder screen plate change-over mechanism comprising, means defining a flow passage, a slide arranged to carry at least two screen plates and movable transversely relatively to said flow passage to place a selected one of said screen plates in alignment with said flow passage, and means for clamping said slide, said means including abutment means, a bush having a bore in alignment with said passage, said slide being interposed between said bush and said abutment means, thrust pins arranged concentrically with, and uniformly spaced around, said bore, and means operable to urge said thrust pins to force said bush against said slide whereby to clamp said slide against said abutment means.

BRIEF DESCRIPTION OF THE DRAWINGS

An embodiment of the invention will now be described by way of example only with reference to the accompanying diagrammatic drawing, in which.

DESCRIPTION OF THE PREFERRED EMBODIMENT

Figure 1:
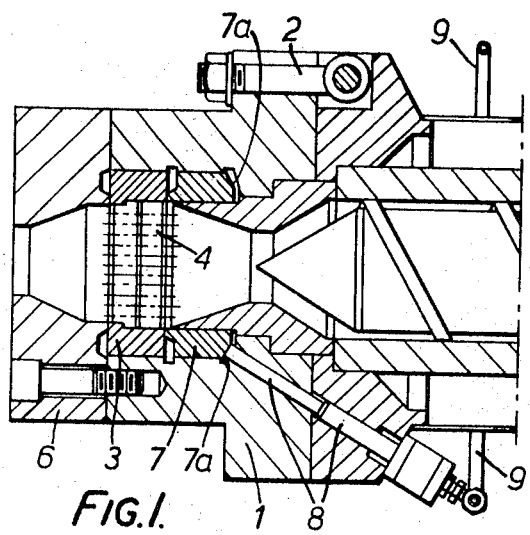
FIG. 1 is a vertical section through a change-over mechanism in accordance with the invention.
Figure 2:
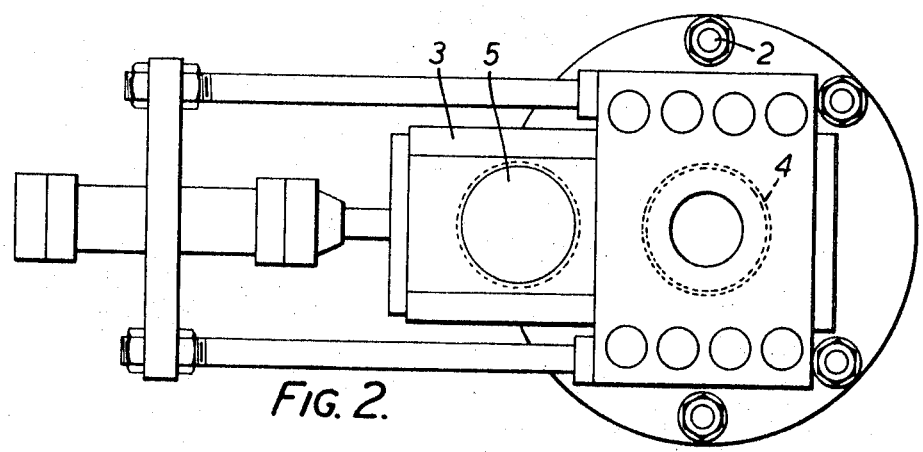
FIG. 2 is a front elevation of the mechanism shown in FIG. 1.

As shown in FIG. 1, the screen plate change-over mechanism comprises a housing 1, which is secured to the mouth of an extruder by means of, for example, eye-bolts 2. The housing 1 receives a slide 3, which, in the embodiment illustrated, carried two screen plates 4 and 5. The slide is movable under the action of a hydraulic drive transversly relative to the axis of the extruder to place a selected one of the screen plates in alignment with the flow passage of the mix.

The front of the housing 1 is partially closed by an end plate 6, which is capable of withstanding the axial pressures exerted by the mix and is so constructed that a wide range of extrusion dies (not shown) can be attached to it.

The flow passage, for the mix, provided through the mechanism is so shaped, that no dead spaces arise and optimum conditions exist for the flow of the mix.

The slide 3 can be clamped in position by a cylindrical bush 7, under the action of thrust pins 8 which are actuated by fluid under pressure. The lines of action, or pressure points, of the thrust pins 8 lie on a circle concentric with the bore 7a of the bush 7, the pins 8 being uniformly spaced around the circle.

The axis of every thrust pin 8 constitutes a generator line of the same conical surface.

Figure 3:
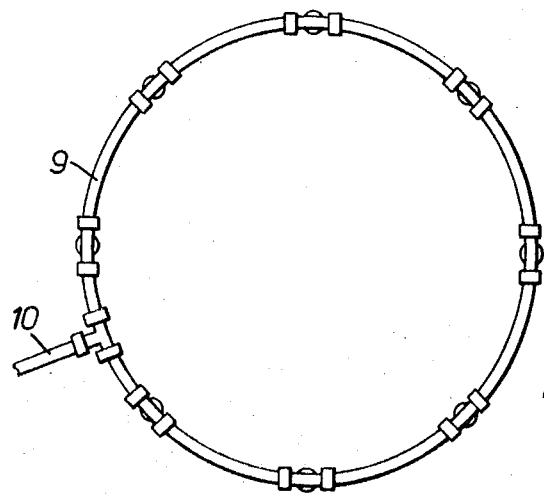
FIG. 3 shows schematically a pipeline through which fluid is supplied under pressure to thrust pins in the mechanism shown in FIG. 1.

As shown in FIG. 3, the thrust pins are actuated by fluid supplied under pressure through a ring pipe 9, the fluid being supplied to the pipe 9 from a feed-pipe 10.

The mechanism operates as follows:

When it is desired to change the screen plate 4, for example, the cylindrical bush 7 is released, by interrupting the action of the pressure fluid on the thrust pins 8 to unclamp the slide 3. The slide 3 can thereupon be moved transversely, enabling the screen plate 5 to be moved into alignment with the flow passage through the extruder. When the plate 5 is in alignment with the flow passage the screen plate 4 is outside the housing 1 and can be readily replaced by a clean screen plate.

On completion of the movement of the slide 3, the pressure fluid is re-applied to the thrust pins 8 and forces the cylindrical bush 7 evenly against the slide 3, which is thus clamped in place between the bush and the end plate 6.

The regular distribution of the lines of action of the thrust pins 8 ensures that the pins apply an even pressure to the slide 3, and conversely that the cylindrical bush 7 is evenly released when the pressure on the thrust pins 8 is relieved. By judicious choice of operating pressure, the pressure exerted by the cylindrical bush is far in excess of the pressure exerted by the plasticised mix.

The mechanism described is advantageous in that the forces exerted by the pressure of the mix on the clamping components are absorbed, whereby the only forces that need to be exerted are those required for effecting a seal against the pressure of the mix.

Also the slide can be rapidly released, once the pressure of the fluid is removed from the thrust pins, and jamming, which has arisen in the cottered mechanisms proposed hitherto, does not occur.

What is claimed is:

1. An extruder screen plate change-over mechanism comprising,
   means defining a flow passage,
   a slide arranged to carry at least two screen plates and movable transversely relatively to said flow passage to place a selected one of said screen plates in alignment with said flow passage, and
   means for clamping said slide, said means including,
   abutment means downstream of said slide,
   a cylindrical bush arranged upstream of said slide, said bush having a bore in alignment with said passage, said slide being interposed between said bush and said abutment means,
   thrust pins arranged concentrically with, and uniformly spaced around, said bore, and
   means operable to urge said thrust pins to force said bush downstream against said slide whereby to clamp said slide against said abutment means.

2. A mechanism as claimed in claim 1 further comprising a fluid feed pipe arranged in the form of a ring and through which pressurized fluid is fed sequentially to said thrust pins.

3. A mechanism as claimed in claim 2 in which the axis of each said thrust pin defines a generator of the same conical surface.

* * * * *